US005373154A

United States Patent [19]
Chen

[11] Patent Number: 5,373,154
[45] Date of Patent: Dec. 13, 1994

[54] MULTISYNCHRONIZING SIGNAL OPTICAL SCANNING SYSTEM FOR DISPENSING POSITION ERROR

[75] Inventor: Chun-Yen Chen, Hsinchu, Taiwan, Prov. of China

[73] Assignee: Industrial Technology Research Institute, Hsinchu, Taiwan, Prov. of China

[21] Appl. No.: 103,675

[22] Filed: Aug. 10, 1993

[51] Int. Cl.⁵ .............................................. H01J 5/16
[52] U.S. Cl. .................................. 250/235; 358/481; 346/108
[58] Field of Search ................ 250/235, 236, 563; 358/296, 293, 481, 480, 474, 494, 496; 346/108, 160

[56] References Cited
U.S. PATENT DOCUMENTS
4,837,588  6/1989  Imakawa et al. ............... 250/235
4,943,871  7/1990  Miyagawa .................... 358/481

Primary Examiner—David C. Nelms
Assistant Examiner—Que T. Le
Attorney, Agent, or Firm—Michael D. Bednarek, Marks & Murase

[57] ABSTRACT

An optical scanning system uses a multiple synchronizing sensing device to device a row of modulated signals into multiple blocks so that the effect of velocity jitter of a polygon scanning mirror is evenly distributed on each zone. In this manner, the influence of printing quality by the velocity jitter is reduced. For instance, the multiple synchronizing sensing device is provided with twenty sensing elements, the influence of the velocity jitter is lessened to be one twenth time as much as its original value. Therefore, the cost is greatly lowered by applying the system of the present invention to a high resolution optical scanning device which utilizes a polygon scanning mirror of less precision.

4 Claims, 9 Drawing Sheets

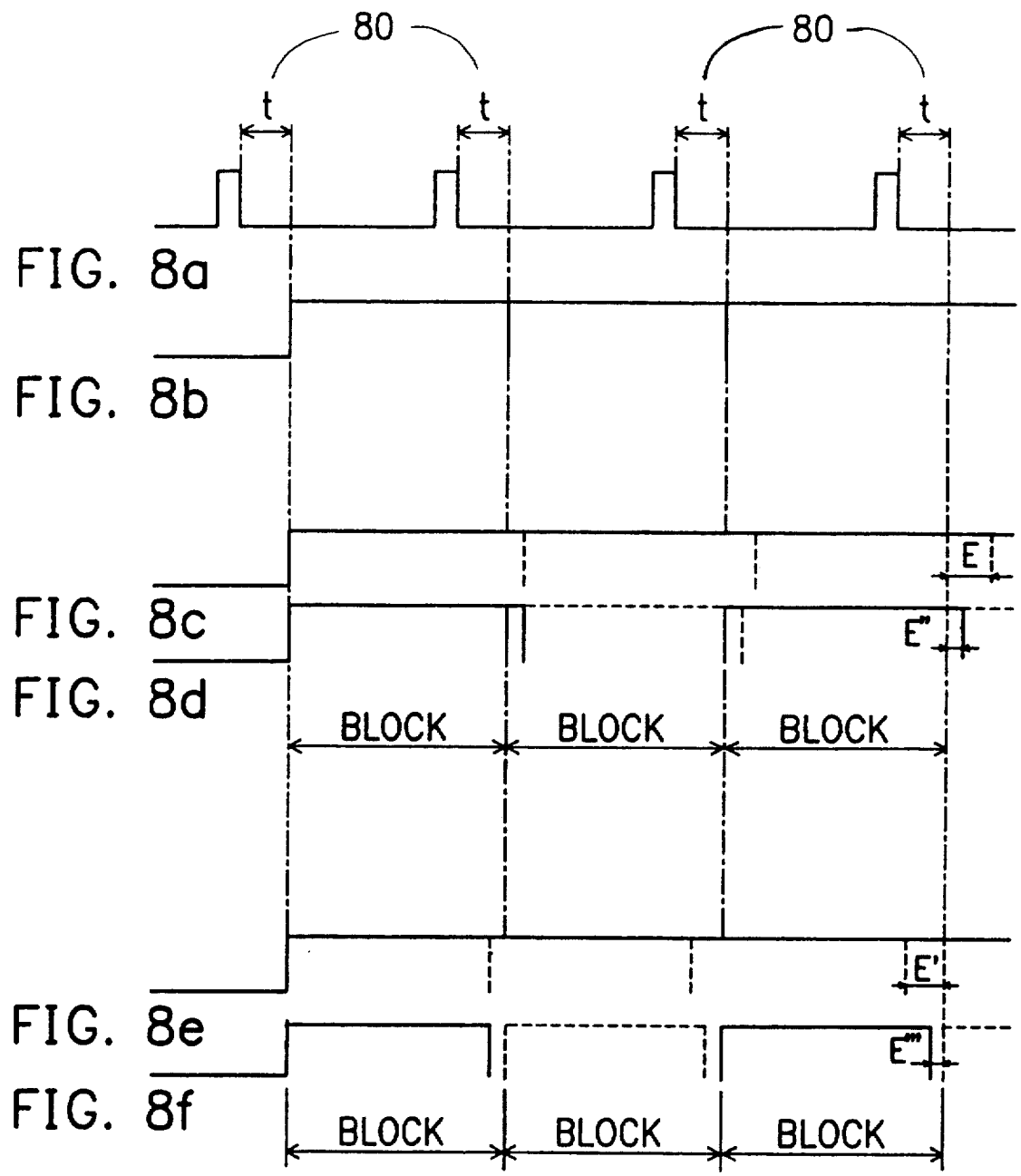

MULTISYNCHRONIZING SIGNAL OPTICAL SCANNING SYSTEM FOR DISPENSING POSITION ERROR

BACKGROUND OF THE INVENTION

1. Field of the Invention

The present invention relates to an optical scanning system, and in particular to a polygon mirror scanner with poorer precision that can distribute its velocity jitter, further can improve the quality and lower the cost of the optical scanning system.

2. Description of Prior Art

For equipment that employs an optical scanning system, such as a laser printer, the requirements of the velocity jitter (i.e., speed variation) of an optical scanner increases as the resolution degree is improved. In addition, the accuracy of a scanning velocity jitter also increases as the resolution degree improves.

Besides, the standard for the velocity jitter and the cost become increasing high as a printing paper is enlarged or resolution degree improves.

Nowadays, if the standard of the velocity jitter is too strict, the polygon mirror scanner technique will be difficult to meet specifications.

FIG. 1 illustrates a schematic diagram of a prior art optical scanner system employing a laser printer. The prior art optical scanner system is suited for use in the electronic control system 10. A light beam is emitted by a modulated laser diode 12, and then impinges on a photoconductive drum 14. The prior art optical scanner system primarily comprises a collimating lens 20, a cylindrical lens 30, a polygon mirror 40 and an optical scanning lens 50. The light beam of laser diode 12 having image information which is a series of modulating signals. The collimating lens 20 makes all the light beam parallel. The parallel light beam as a whole is considered as a modulating signal beam 11. The cylindrical lens 30 focuses the modulation light beam 11 which is passed through the collimating lens 20 and the cylindrical lens 30. Then, the light beam impinges on a rotating polygon mirror 40. The rotating polygon mirror 40 is driven to rotate by a motor at constant speed. The polygon mirror 40 is provided with a plurality of identical flat mirrors, and, thus, the light beam incident upon one of the mirror surfaces of the polygon mirror 40 is reflected so that the reflected light beam now passes through an optical scanning lens 50, which serves as a linear focusing lens. Then the light beam is reflected by a flat mirror 16 to impinge upon a photoconductive drum 14.

Besides, the synchronizing light beam 22 passes through the optical scanning lens 50, a reflecting mirror 62, a focusing lens 64, and an optical fiber 66 and then impinges on a photodiode 68. The photodiode 68 receives the light beam 22 and transfers it to an electronic signal. Then, the electronic signal passes through the electronic control system 10. The electric signal is used as a starting synchronizing signal of each line printing signal. Because the position of the optical scanning lens 50, the reflecting mirror 62, the focusing lens 64, the optical fiber 66 and the photodiode 68 are fixed, the light beam position can be treated as a reference point, so as to lessen the influence caused by the angle inaccuracy and velocity jitter of the polygon mirror 40, and let the starting points of all printing lines be the same. Therefore, the synchronizing light beam 22 can be treated as the starting synchronizing signal of each line printing signal.

FIG. 2a–2d are comparative diagrams of the effect of the velocity jitter of the prior art optical scanner system in FIG. 1 on the printing velocity (or printing length), in which FIG. 2a shows a synchronizing signal, FIG. 2b shows a normal printing velocity, FIG. 2c shows that the scanning velocity becomes faster and the printing length becomes longer when the velocity jitter is positive, and FIG. 2d shows that the scanning velocity becomes slower and the printing length becomes shorter when the velocity jitter is negative. When the rotating velocity of the polygon mirror scanner 40 is a constant, i.e., the scanning velocity of every edge of the polygon mirror scanner is the same, the printing length of every line will also be the same. However, if the polygon mirror scanner 40 has a phenomenon of velocity jitter, there will be a change to the scanning velocity. Although all the starting printing points are at the same position 80 as shown in FIG. 2, when the velocity jitter is positive, the scanning velocity becomes faster, the printing length becomes longer, and produce a position error E. When the velocity jitter is negative, the scanning velocity becomes slower, the printing length becomes shorter, and is produced a position error E'. Therefore, when the polygon mirror scanner 40 has a phenomenon of velocity jitter, the printing velocity will be sometimes faster and sometimes slower, this will cause a bad effect on a printed graph or character. Although it is impossible for the velocity jitter to be zero, it can be small enough such that the position error is approximately to be zero and therefore there is almost no influence to the printing quantity. However, the smaller the velocity jitter is, the higher the cost becomes.

SUMMARY OF THE INVENTION

An optical scanning system, employed in an electronic control system which emits a synchronizing signal light beam by means of a synchronizing laser diode so as to produce a series of synchronizing signals, to divide a modulating signal into a series of blocks corresponding to said series of synchronizing signals and subsequently to emit a series of modulating light beams corresponding to said series of blocks by means of a modulated laser diode and finally to impinge the series of modulating light beams to a photoconductive drum. The optical scanning system comprises:

a collimating lens for collimating the light beams emitting from the synchronizing laser diode and the series of modulating light beams emitting from the modulated laser diode so as to parallel light beams;

a cylindrical lens for focusing the parallel light beams coming from the collimating lens;

a polygon mirror scanner for reflecting the synchronizing light beams and the modulating light beams coming from the cylindrical lens to become scanning light beams, respectively;

an optical scanning lens for causing the modulating light beams coming from the polygon mirror scanner to linearly impinge on the photoconductive drum; and a multiple synchronous sensing device for receiving the synchronizing light beams coming from the optical scanning lens to produce a series of synchronizing signals and to transmit the series of synchronizing signals to said electronic control system, and subsequently to control the modulated laser diode according to the series of synchronizing signals by means of the electronic control system to urge the modulated laser diode to emit a series of modulating light beams corresponding to the series of zones.

In addition, the multiple synchronizing sensing device comprises a light diffusing mask plate, a focusing element and a sensing element. The light diffusing mask plate is provided with a plurality of slits. The synchronizing light beams are diffused due to the slits and projected on the sensing element through the focusing element, and the multiple synchronizing sensing device transmits the series of synchronizing signals to the electronic control system when the synchronizing light beams sequentially scan the slits in the light diffusing mask plate. The focusing element of the optical scanning system is a selffoc lens array. The sensing element is a photodiodes array. Moreover, the sensing element comprises optical fibers and a photodiode, whereby synchronizing signal light beams are capable of being guided to the photodiode.

BRIEF DESCRIPTION OF THE DRAWINGS

The present invention can be more fully understood by reference to the following description and accompanying drawings, wherein:

FIG. 8a–8f are comparative diagrams of the modulating signal of the prior art optical scanner system in FIG. 1 and the modulating signal of the present invention.

DETAILED DESCRIPTION OF THE PREFERRED EMBODIMENTS

Figure 3:
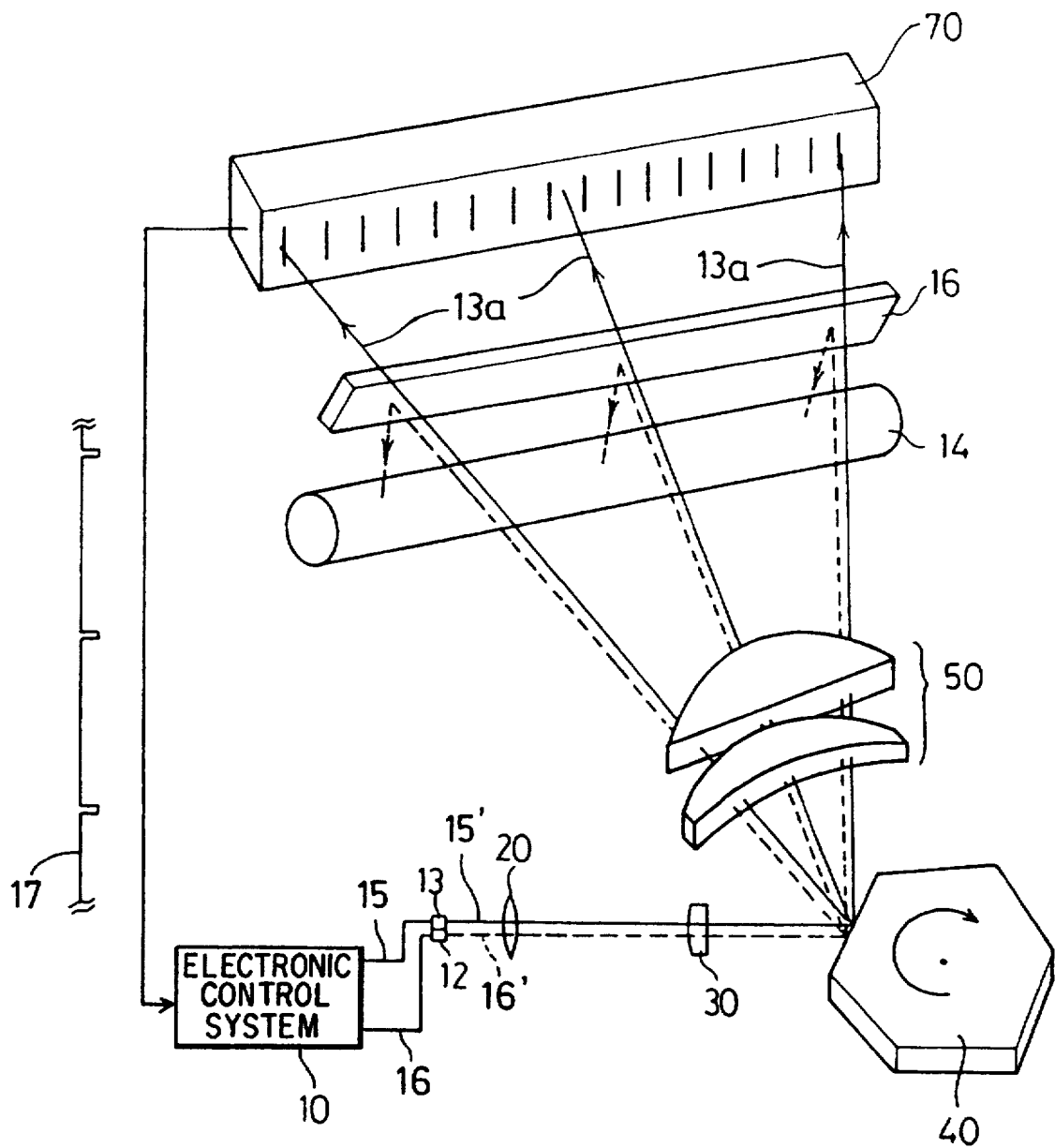
FIG. 3 is a schematic diagram of an optical scanner system of the present invention.

FIG. 3 is a schematic diagram of an optical scanner system of the present invention. In reference numeral 10 denotes an electronic control system, 12 denotes a modulated laser diode, 13 denotes a synchronizing laser diode, 14 denotes a photoconductive drum, 16 denotes a reflecting mirror, 20 denotes a collimating lens, 3 denotes a cylindrical lens, 40 denotes a polygon mirror scanner, 50 denotes an optical scanning lens, and 70 denotes a multiple synchronous sensing device. The optical scanner system of the present invention is suited for use in the electronic control system 10, which emit electronic signal 15 to control the synchronizing laser diode 13, then emits the synchronizing light beam 15'. The control system 10 also emits a modulating signal 16 to modulate the modulated laser diode 12. The modulating signal is divided into a series of zones corresponding to the synchronous signals 17. The modulated laser diode 12 emits a corresponding series of modulating light beams 16' according to the synchronizing signals and finally impinges on the photoconductive drum 14.

The characteristics of the optical scanner system of the present invention is that it has a multiple synchronizing sensing device 70 for receiving the synchronizing light beam and then converts the synchronizing light beam to the synchronizing signals 17, then, transmits the synchronizing signal to the electronic control system 10. Specifically, the series of synchronizing signal light beams 15 transmitted by the synchronized laser diode 13 passes through the collimating lens 20, and the cylindrical lens 30 and then reflected by the polygon mirror scanner 40. Subsequently, the series of synchronizing signals light beam passes through the optical scanning lens 50, and then impinges on the multiple synchronizing sensing device 70. In the meantime, the electronic control system 10 emits a series of modulating light beams 16' corresponding to the modulating signal zones by means of the modulated laser diode 12 according to the synchronizing signal.

Consequently, if N synchronizing signals are applied, the position error "Δ" introduced by the velocity jitter of the polygon mirror scanner 40 will be distributed evenly on each signal block as best shown in FIG. 8d and 8f. In other words, if the position error is denoted by "Δ", it will become "Δ/N" by using the present invention.

Figure 4:
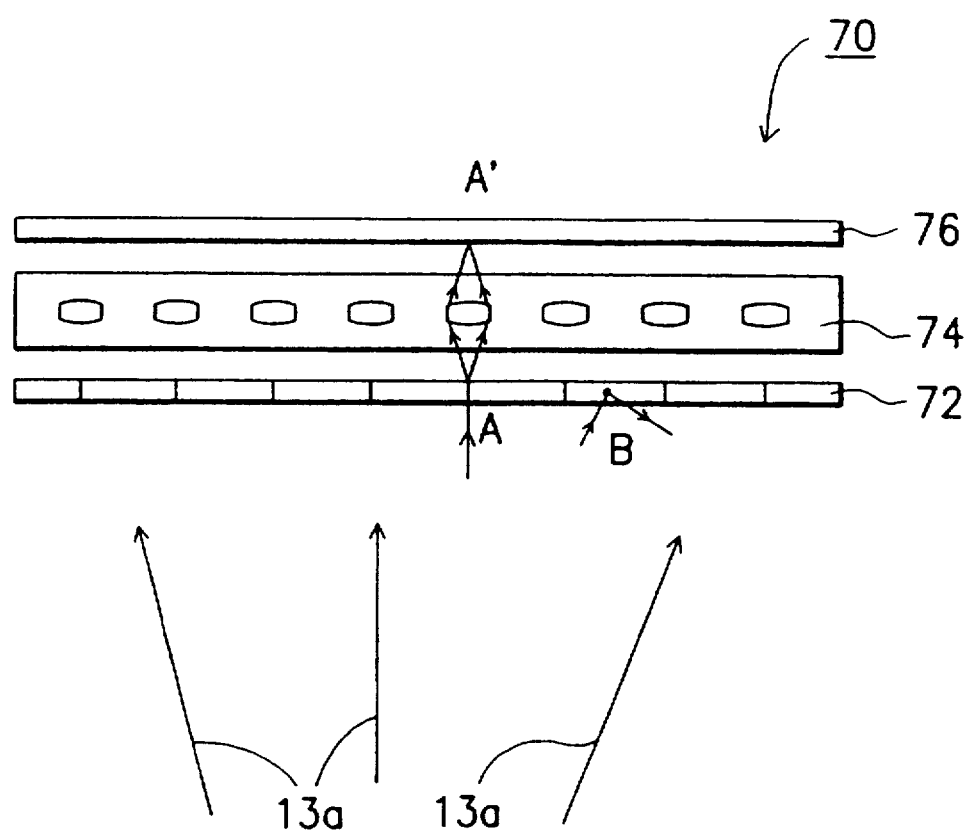
FIG. 4 is a structural diagram of a multiple synchronous sensing device of the present invention.
Figure 5A:
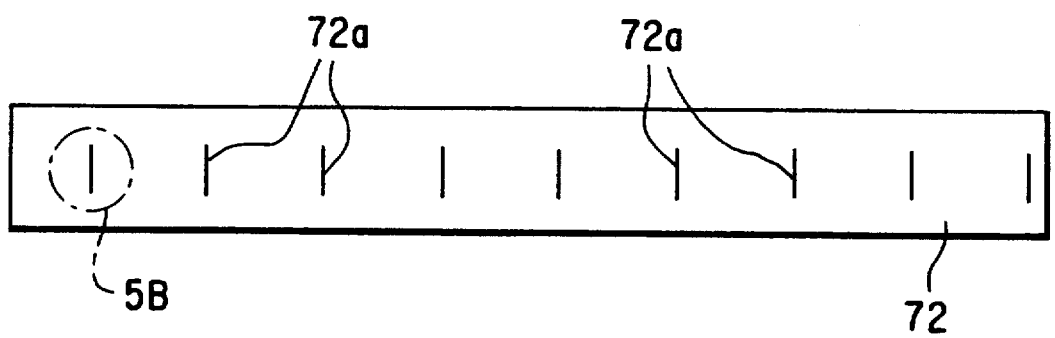
FIG. 5 is an orthographic drawing of a light diffusing mask plate of the multiple synchronous sensing device of the present invention in FIG. 4.
Figure 5B:
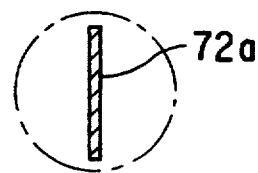

FIG. 4 is a structural diagram of a multiple synchronizing sensing device of the present invention. Reference numeral designates 13a indicates a synchronizing signal light beam. The multiple synchronizing sensing device 70 comprises a light diffusing mask plate 72, a focusing element 74, a sensing element 76. FIG. 5 is an orthographic drawing of the light diffusing mask plate 72. The light diffusing mask plate 72 has a plurality of slits 72a. A diffused light is generated as the synchronizing light beams 13a passes the slit 72a, and this diffused light is similar to a new light source. In addition, the light diffusing mask plate 72 can be made by opaque, light-absorbing or light-reflecting material. When a light beam impinges on point "A" as shown in FIG. 4 (i.e., the slit 72a as shown in FIG. 5), the light beam is diffused. This diffused light is focused on point A' by the focusing element 74. The sensing element 76 receives the light signal and then converts it to a electronic synchronizing signal. If a light beam impinged on point "B" as shown in FIG. 4, it will be absorbed or reflected. Thus, the sensing element 76 will not be able to receive the light signal. Consequently, only the light beam passing the slit 72a are received by the sensing element 76. Further, the position of the sensing element 76 can be made quite precise. For the reason that the position of the multiple synchronizing sensing device is fixed, it can be used as a synchronizing signal.

The focusing element 74 can be any optical elements for focusing the light beam passing the slit 72a of the light diffusing mask plate 72 onto the sensing element 76. Examples of the optical elements are conventional lens, the selffoc lens array 74a as shown in FIG. 6 and FIG. 7, HOE (Holographic Optical Element), a plastic lens, an optical fibre and so on.

Figure 6:
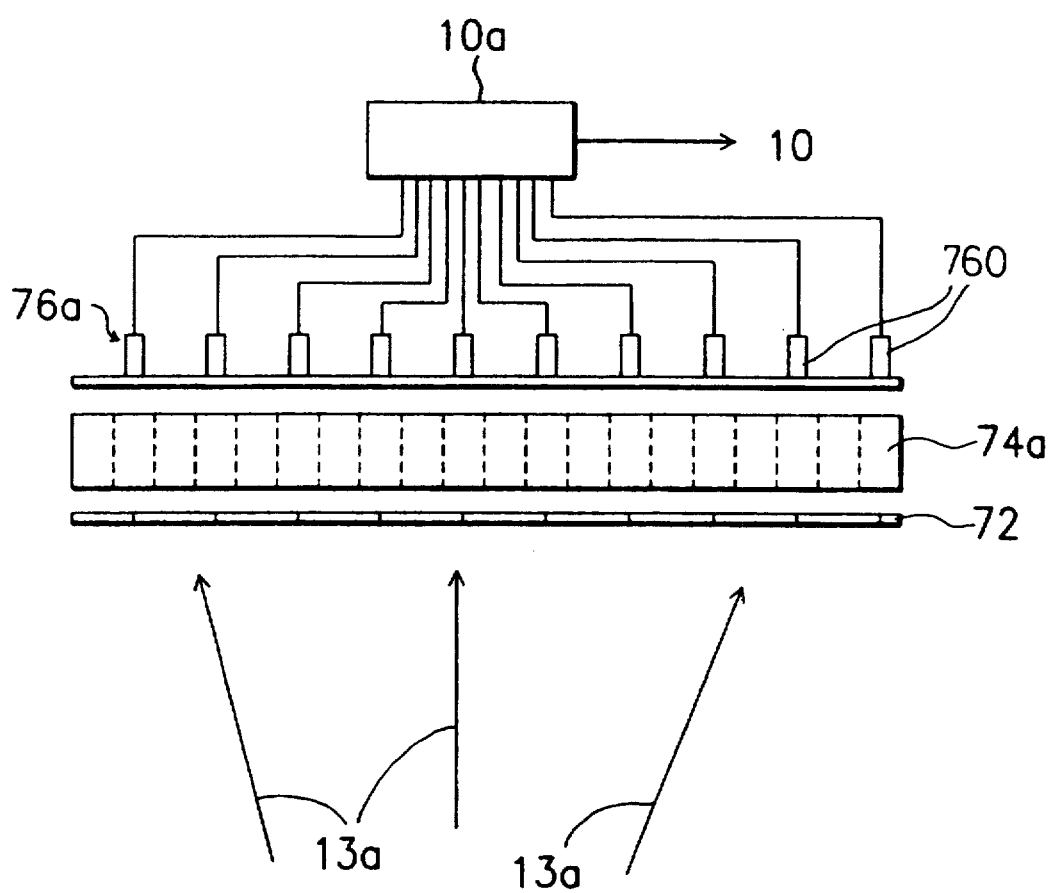
FIG. 6 is a structural diagram of the first embodiment of the multiple synchronous sensing device of the present invention.
Figure 7:
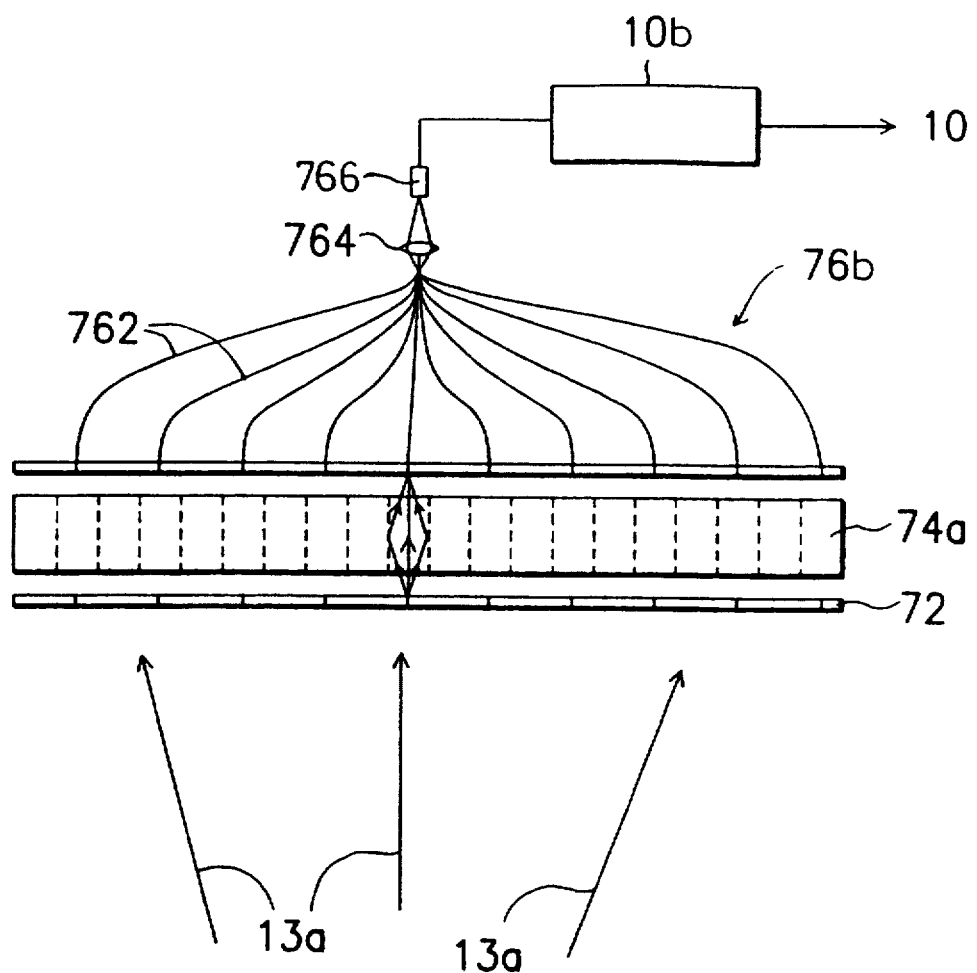
FIG. 7 is a structural diagram of the multiple synchronous sensing device according to the second embodiment of the present invention.

FIG. 6 is a structural diagram of the multiple synchronizing sensing element device according to the first embodiment of the present invention. The sensing element 76a can be a photodiodes array consisting of multiple photodiodes 760. The photodiodes array receives the signal and transmits it to an electronic system 10a. After the signal being processed in the electronic system 10a, it is transmitted directly to the electronic control system 10. FIG. 7 is a structural diagram of the multiple synchronizing sensing device 70 according to the second embodiment of the present invention. The sensing element 76b is an optical fiber 762 for guiding each synchronizing light beam impinge on a photodiode 766 through a focusing lens 764 and converts to a electronic signal 768, and this signal 768 is magnified by an amplifier 10b. Subsequently, it is transmitted directly to the electronic control system 10.

Figure 1:
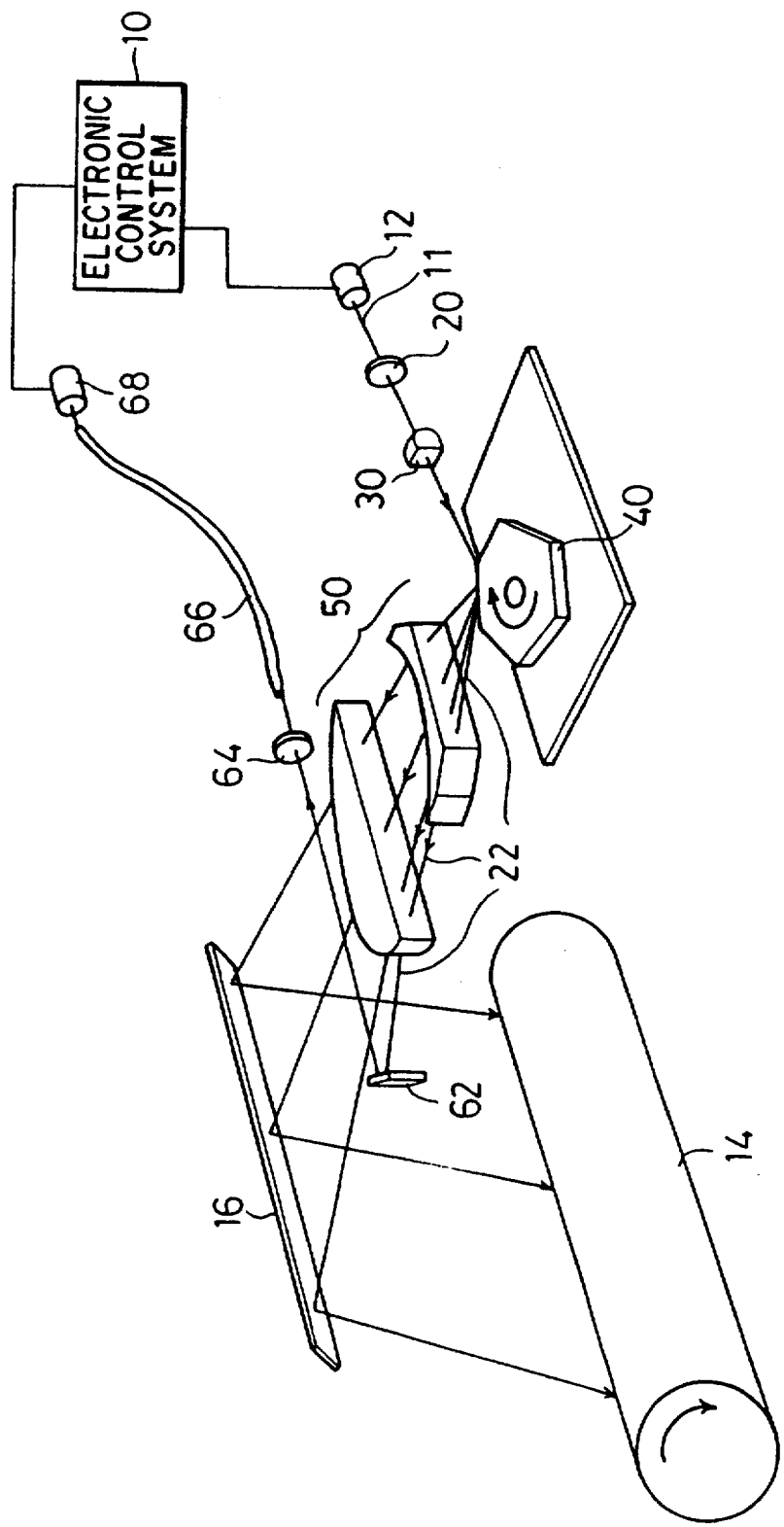
FIG. 1 is a schematic diagram of a prior art optical scanner system employed in a laser printer.
Figure 2:
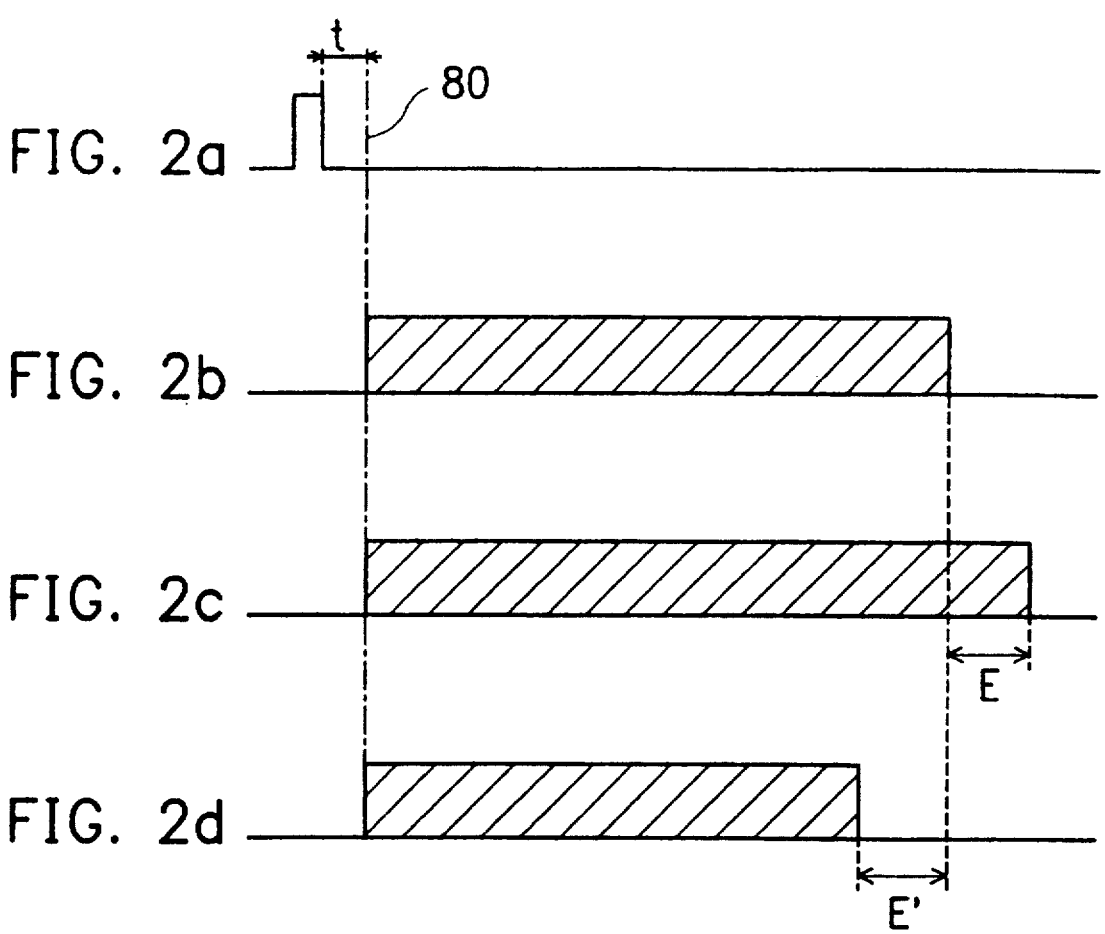
FIG. 2a–2d are comparative diagrams of the effect of typical velocity jitters on the printing velocity of the prior art optical scanner system as shown in FIG. 1.

FIG. 8a–8f are comparative diagrams of the modulating signal of the prior art optical scanner system in FIG. 1 and the modulating signal of the present invention. FIG. 8a shows the multiple synchronizing signal of the present invention. FIG. 8b shows the normal modulating signal. FIG. 8c shows the modulating signal of the velocity jitter of the prior art system when the velocity jitters is positive. FIG. 8d shows the modulating signal of the velocity jitter of the present invention when the velocity jitter is positive. FIG. 8e shows the modulating signal of the velocity jitter of the prior art system when the velocity jitter is negative. FIG. 8f shows the modulating signal of the velocity jitter of the present invention when the velocity is negative. If the multiple synchronizing sensing device 70 is not used, the printing quality will be worse. This is because the output signal of the optical scanner is affected by the polygon mirror scanner 40. The scanning velocity of each line will be different, and, then the printing velocity will also be difference, this will further cause the printing length of each line different. The difference quantity is called as position error (i.e., the position error $\Delta$, $\Delta$ as shown in FIG. 2 and FIG. 8).

If the multiple synchronizing sensing device 70 of the present invention is used, the signal of each block will be sent after a time delay "t" of each corresponding synchronizing signal. This can evenly distribute the position error ($\Delta$, $\Delta$) generated by the velocity jitter to each block (i.e, the position error $\Delta$, $\Delta$ as shown in FIGS. 8d and 8f). Therefore, the position error of the prior art which employs the single synchronizing signal method will be accumulated as shown in FIG. 8c and 8e. However, if the multiple synchronizing sensing device of the present invention is employed, the starting point of every block will be reset to the starting point 80.

Take the scanning width 200 mm as an example, if the velocity jitter error percentage is 0.1%, then the maximum position error of each line will be 0.2 mm. However, if N synchronizing signals are applied, the maximum position error will become (0.2/N) mm. For an example, if N is 20, the maximum position error will become 0.01 mm. In other words, the precision is increased by 20 times.

Figure 9A:
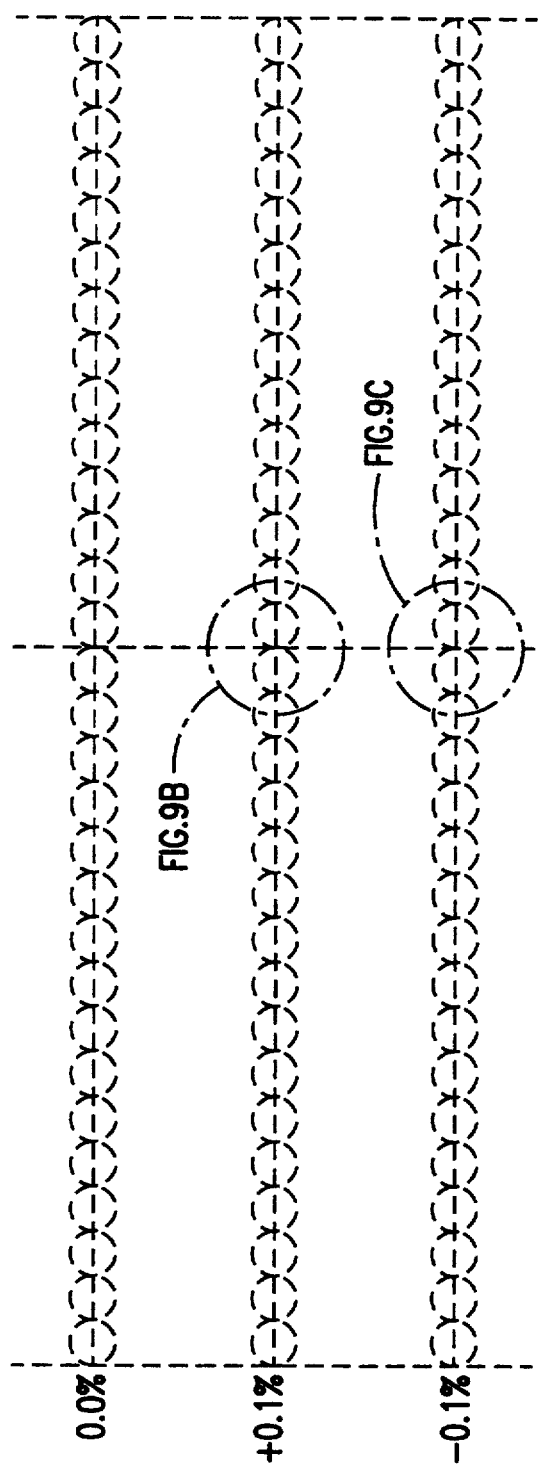
FIG. 9 is a schematic diagram of the effect of the multiple synchronous signal of the present invention on the velocity jitter.
Figure 9C:
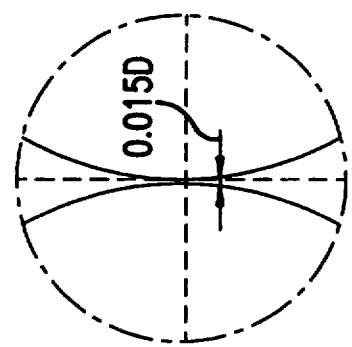
Figure 9B:
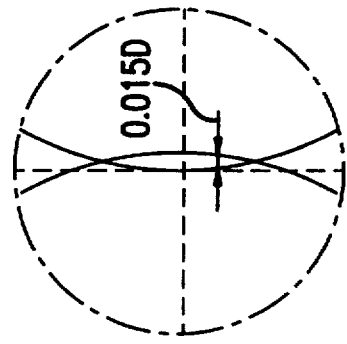

FIG. 9 is a schematic diagram of the effect of the multiple synchronous signal of the present invention on the velocity jitter. If the velocity jitter error is ±0.1%, and take 16 points as a block, the maximum position error will be only ±0.015D (D denotes a light spot pitch). If take 256 points as a block, the maximum position error will be only ±0.24D.

It can be concluded from the above description that the optical scanner system of the present invention can reduce the poor printing quantity caused by the velocity jitter. Since the present invention has a multiple synchronizing sensing device for generating multiple synchronizing signals and dividing the modulating signal of every line into multiple blocks which correspond to each synchronizing signal. Consequently, in the optical scanner of high resolution, the cost can be reduced by using the polygon mirror scanner of less precision.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical scanning system, employed in an electronic control system which emits electronic signals to control a synchronizing laser diode, then emits a synchronizing light beam, and then produces a series of synchronizing signals, the control system further divides a modulating signal into a series of blocks corresponding to said series of synchronizing signals and subsequently emits a series of modulating light beams corresponding to said series of blocks by means of a modulated laser diode and finally impinges said series of modulating light beams on to a photoconductive drum, said optical scanning system comprising:

a collimating lens for collimating said synchronizing light beams emitted by said synchronizing laser diode and said series of modulating light beams emitted by said modulated laser diode so as to parallel light beams;

a cylindrical lens for focusing said parallel light beams coming from said collimating lens;

a polygon mirror scanner for reflecting said synchronizing light beams and said modulating light beams coming from said cylindrical lens to become scanning light beams, respectively;

an optical scanning lens for linearly impinging said modulating signal light beams coming from said polygon mirror scanner on said photoconductive drum; and a multiple synchronizing sensing device for receiving said synchronizing light beams coming from said optical scanning lens to produce a series of synchronizing signals and to transmit said series of synchronizing signals to said electronic control system, and subsequently to modulate said modulated laser diode according to said series of synchronizing signals by means of said electronic control system to urge said modulated laser diode to emit a series of modulating light beams corresponding to said series of blocks;

wherein said multiple synchronizing sensing device comprises a light diffusing mask plate, a focusing element and a sensing element, said light diffusing mask plate being provided with a plurality of slits, said synchronizing signal beams being diffused and impinged on said sensing element through said focusing element to convert said series of synchronizing signals, and transmit the synchronizing signals to said electronic control system when said synchronizing signals light beams sequentially scan said slits in said light diffusing mask plate.

2. An optical scanning system as claimed in claim 1, wherein said focusing element is a selffoc lens array.

3. An optical scanning system as claimed in claim 1, wherein said sensing element is a photodiode array consisting of multiple photodiodes.

4. An optical scanning system as claimed in claim 1, wherein said sensing element comprises optical fibers and a photodiode, whereby said synchronizing light beams are capable of being guided to impinge on said photodiode.

* * * * *